United States Patent
Carlough et al.

(10) Patent No.: US 9,606,927 B2
(45) Date of Patent: *Mar. 28, 2017

(54) SET SELECTION OF A SET-ASSOCIATIVE STORAGE CONTAINER

(71) Applicant: International Business Machines Corporation, Armonk, NY (US)

(72) Inventors: Steven R. Carlough, Poughkeepsie, NY (US); Adam B. Collura, Hopewell Junction, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/249,796

(22) Filed: Aug. 29, 2016

(65) Prior Publication Data

US 2016/0357682 A1   Dec. 8, 2016

Related U.S. Application Data

(63) Continuation of application No. 15/067,305, filed on Mar. 11, 2016, which is a continuation of application No. 14/624,624, filed on Feb. 18, 2015.

(51) Int. Cl.
  *G06F 12/08*    (2016.01)
  *G06F 12/0864*  (2016.01)

(52) U.S. Cl.
  CPC .. *G06F 12/0864* (2013.01); *G06F 2212/6032* (2013.04)

(58) Field of Classification Search
  CPC ......... G06F 12/0864; G06F 2212/6032; G06F 12/0873; G06F 12/082; G06F 2212/69
  USPC .................................................. 711/128, 216
  See application file for complete search history.

(56) References Cited

U.S. PATENT DOCUMENTS

| | | |
|---|---|---|
| 6,405,287 B1 | 6/2002 | Lesartre |
| 2002/0188808 A1 | 12/2002 | Rowlands et al. |
| 2015/0186280 A1 | 7/2015 | Lepak et al. |

OTHER PUBLICATIONS

List of IBM Patents or Patent Applications Treated as Related; (Appendix P), Nov. 29, 2016, 2 pages.
U.S. Appl. No. 14/624,624, filed Feb. 18, 2015; Entitled: Set Selection of a Set-Associative Storage Container; First Named Inventor: Steven R. Carlough.
U.S. Appl. No. 15/067,305, filed Mar. 11, 2016; Entitled: Set Selection of a Set-Associative Storage Container; First Named Inventor: Steven R. Carlough.

*Primary Examiner* — Jasmine Song
(74) *Attorney, Agent, or Firm* — Cantor Colburn LLP

(57) ABSTRACT

A system includes a set-associative storage container and a processor configured to generate a vector that is a random number. Two or more residue functions are applied to the vector that each produces a state signal including a different number of states based on the vector. A set status is determined that identifies whether each set of the set-associative storage container is enabled or disabled. One of the state signals is selected that has a same number of states as a number of the sets that are enabled. The selected state signal is mapped to the sets that are enabled to assign each of the states of the selected state signal to a corresponding one of the sets that are enabled. A set selection of the set-associative storage container is output based on the mapping to randomly select one of the sets that are enabled from the set-associative storage container.

1 Claim, 4 Drawing Sheets

SET SELECTION OF A SET-ASSOCIATIVE STORAGE CONTAINER

PRIORITY

This application is a Continuation of legally related U.S. patent application Ser. No. 15/067,305 filed Mar. 11, 2016, which is a Continuation of U.S. patent application Ser. No. 14/624,624 filed on Feb. 18, 2015, the entire contents of which are incorporated herein by reference.

BACKGROUND

Various embodiments of this disclosure relate to computer memory management and, more particularly, to set selection of a set-associative storage container.

Computer processing systems typically include one or more levels of cache memory to more quickly retrieve data relative to larger storage areas that are relatively slower to access, such as main memory. Some cache designs are partitioned into set-associative congruence classes to support address mapping, where cached data can be assigned to one of N set locations within a congruence class (N-way set associative, where each cache row is a congruence class of N sets). Such a cache is an example of a set-associative storage container. As another example, a set-associative storage container can be used for performance reasons as part of a processing pipeline.

When data is to be written into a particular congruence class of a set-associative storage container, a method must be employed to select one of the sets to write. The method used depends on the specific nature of the data and the mechanism the set-associative storage container is used for. Least recently used (LRU) is one example of a set marking and selection method, which generally offers the best performance, but at the cost of substantial logic to maintain and update the LRU state. Another less costly method, but not as high in performance, is a pseudo-LRU. In some instances, randomly or pseudo-randomly selecting a set can be appropriate, such as for a set-associative storage container that is used for maintaining performance data that exhibits volatile behavior (e.g., the data stored may help performance in most cases, and in others, hurt performance).

When one or more sets of a set-associative storage container are faulty, it can be challenging to maintain well balanced use of the non-faulty sets. One approach is to create logic that sequentially rotates through the non-faulty sets; however, such an approach becomes very complex when dealing with the possibility of multiple faulty sets.

SUMMARY

In one embodiment of this disclosure, a computer-implemented method includes generating a vector that is a random number. Two or more residue functions are applied to the vector, where the two or more residue functions each produces a state signal including a different number of states based on the vector. A set status of a set-associative storage container in a computer system is determined. The set status identifies whether each set of a plurality of sets of the set-associative storage container is enabled or disabled. One of the state signals is selected that has a same number of states as a number of the sets that are enabled. The selected state signal is mapped to the sets that are enabled to assign each of the states of the selected state signal to a corresponding one of the sets that are enabled. A set selection of the set-associative storage container is output based on the mapping to randomly select one of the sets that are enabled from the set-associative storage container.

In another embodiment, a system includes a set-associative storage container and a processor configured to perform a method that includes generating a vector that is a random number. Two or more residue functions are applied to the vector, where the two or more residue functions each produces a state signal including a different number of states based on the vector. A set status of the set-associative storage container is determined. The set status identifies whether each set of a plurality of sets of the set-associative storage container is enabled or disabled. One of the state signals is selected that has a same number of states as a number of the sets that are enabled. The selected state signal is mapped to the sets that are enabled to assign each of the states of the selected state signal to a corresponding one of the sets that are enabled. A set selection of the set-associative storage container is output based on the mapping to randomly select one of the sets that are enabled from the set-associative storage container.

In yet another embodiment, a computer program product includes a computer readable storage medium having program instructions embodied therewith. The program instructions are executable by a processor to cause the processor to perform a method. The method includes generating a vector that is a random number. Two or more residue functions are applied to the vector, where the two or more residue functions each produces a state signal including a different number of states based on the vector. A set status of a set-associative storage container in a computer system is determined. The set status identifies whether each set of a plurality of sets of the set-associative storage container is enabled or disabled. One of the state signals is selected that has a same number of states as a number of the sets that are enabled. The selected state signal is mapped to the sets that are enabled to assign each of the states of the selected state signal to a corresponding one of the sets that are enabled. A set selection of the set-associative storage container is output based on the mapping to randomly select one of the sets that are enabled from the set-associative storage container.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

According to embodiments, set selection of a set-associative storage container is provided that randomly selects an enabled set of the set-associative storage container when one or more sets are disabled. The terms "random" and "randomly" as used herein refer to a numerical generation process that is either completely random or pseudo-random, i.e., statistically random but based on a deterministic causal process. As further described herein, a "set-associative storage container" refers to a cache or any performance structure in a pipeline of a processor, such as a translation lookaside buffer, branch prediction table, and other such set-associative structures known in the art. In a set-associative storage container, entries or sets are replaced with newer data and older data is overwritten. For example, in a 4-way set associative cache, a particular data set may be written to any one of four sets in a congruence class that maps to a source location of the data set. Rather than implementing a strict least recently used (LRU) replacement policy to select which of the four sets should be replaced next, embodiments implement a random set replacement policy.

The random set replacement policy is robust with respect to one or more disabled or deleted sets. For example, one or more sets of an N-way associative storage container can be identified as faulty, which results in set disablement (also referred to as set deletion). Non-faulty sets can still be enabled. In order to maintain random set replacement as the number of enabled sets is reduced, embodiments apply two or more residue functions to a vector of random data and map the available enabled sets of the set-associative storage container to the output states of the residue function. There may be other reasons why a set could be deleted, such as for testing purposes on real hardware. For example, half of the available sets could be deleted, effectively reducing the capacity of the storage container by half. Experiments run in this reduced capacity mode and compared with the default mode (i.e., all sets enabled) can show the performance effect of a smaller storage container size.

Figure 1:
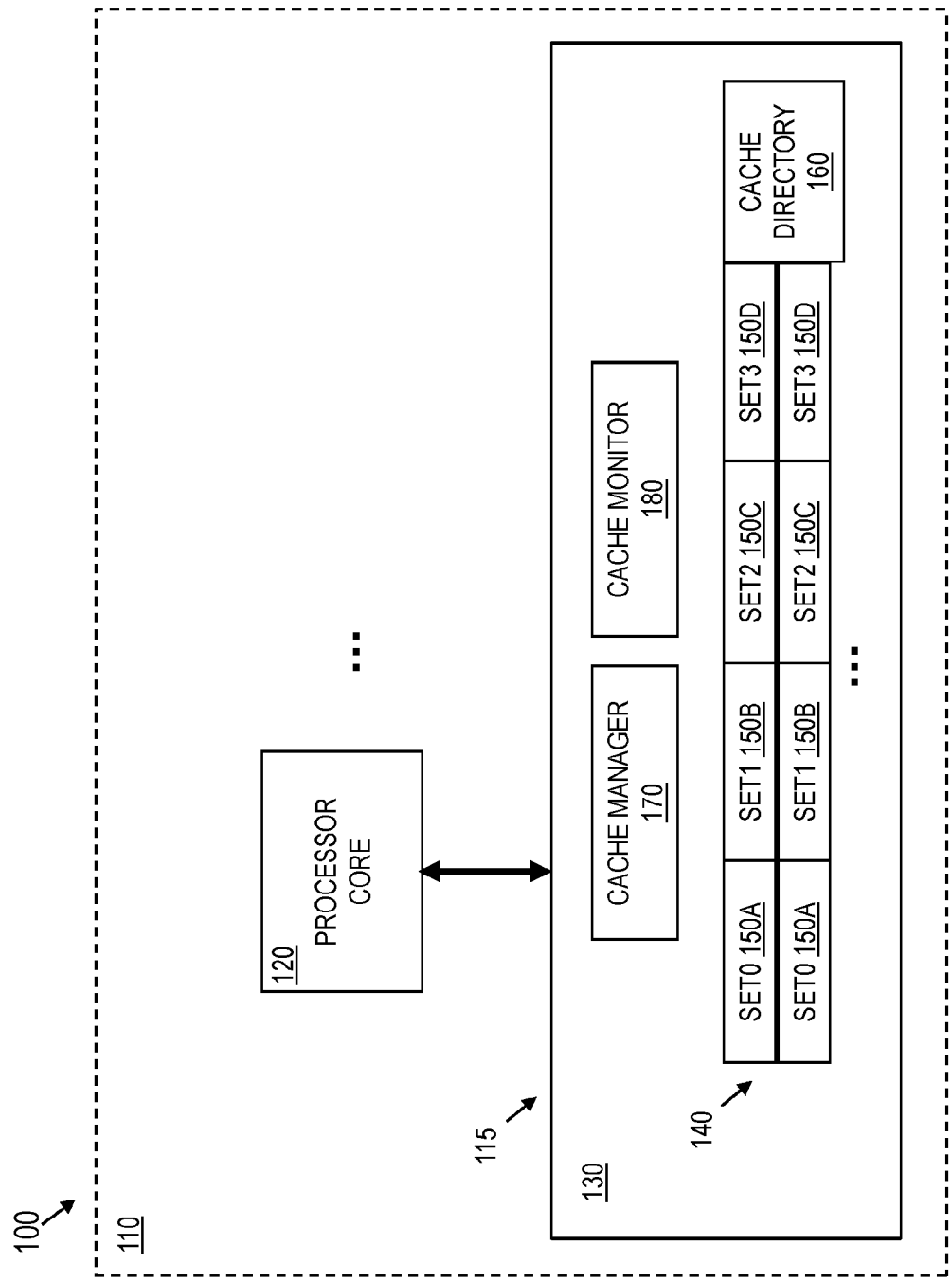
FIG. 1 is a block diagram of a system for set selection of a set-associative storage container, according to some embodiments of this disclosure.

FIG. 1 is a block diagram of a system 100 that includes a processor 110 which performs set selection of a set-associative storage container 115, according to some embodiments of this disclosure. As shown, the processor 110 may include one or more processor cores 120 and a cache 130. The cache 130 is an example of the set-associative storage container 115. Other or additional instances of the set-associative storage container 115 can be implemented within the processor 110, such as within a pipeline structure of the one or more processor cores 120. For ease of explanation, the cache 130 is described as an embodiment of the set-associative storage container 115 in FIG. 1.

The cache 130 includes a plurality of congruence classes 140, which are rows of sets or entries having an N-way association. The example of FIG. 1 is a 4-way set association; however, it will be understood that a greater or lesser number of sets 150 can be associated per congruence class 140. A cache directory 160 can map addresses of data stored in each set 150 of each congruence class 140, as well as store status/validity information for each of the sets 150. The cache directory 160 can be distributed to align with each of the sets 150 or managed as a separate structure. When a new data value is to be written to the cache 130, a cache manager 170 determines which congruence class 140 maps to a location associated with the source of the new data value and must decide whether to replace set0 150A, set1 150B, set2 150C, or set3 150D. Rather than tracking a precise indication of the LRU set, the cache manager 170 applies a random set replacement policy that considers whether any of the sets 150A-150D are disabled. For example, a cache monitor 180 may monitor for parity errors, stuck bits, and the like in the sets 150A-150D. Upon detecting and confirming a fault, or upon command from an external source, such as test/debug instrumentation, the cache monitor 180 can disable or delete one or more of set0 150A, set1 150B, set2 150C, and/or set3 150D. The cache manager 170 implements set selection logic 200 of FIG. 2 to accommodate set selection when one or more sets 150A-150D are disabled.

Figure 2:
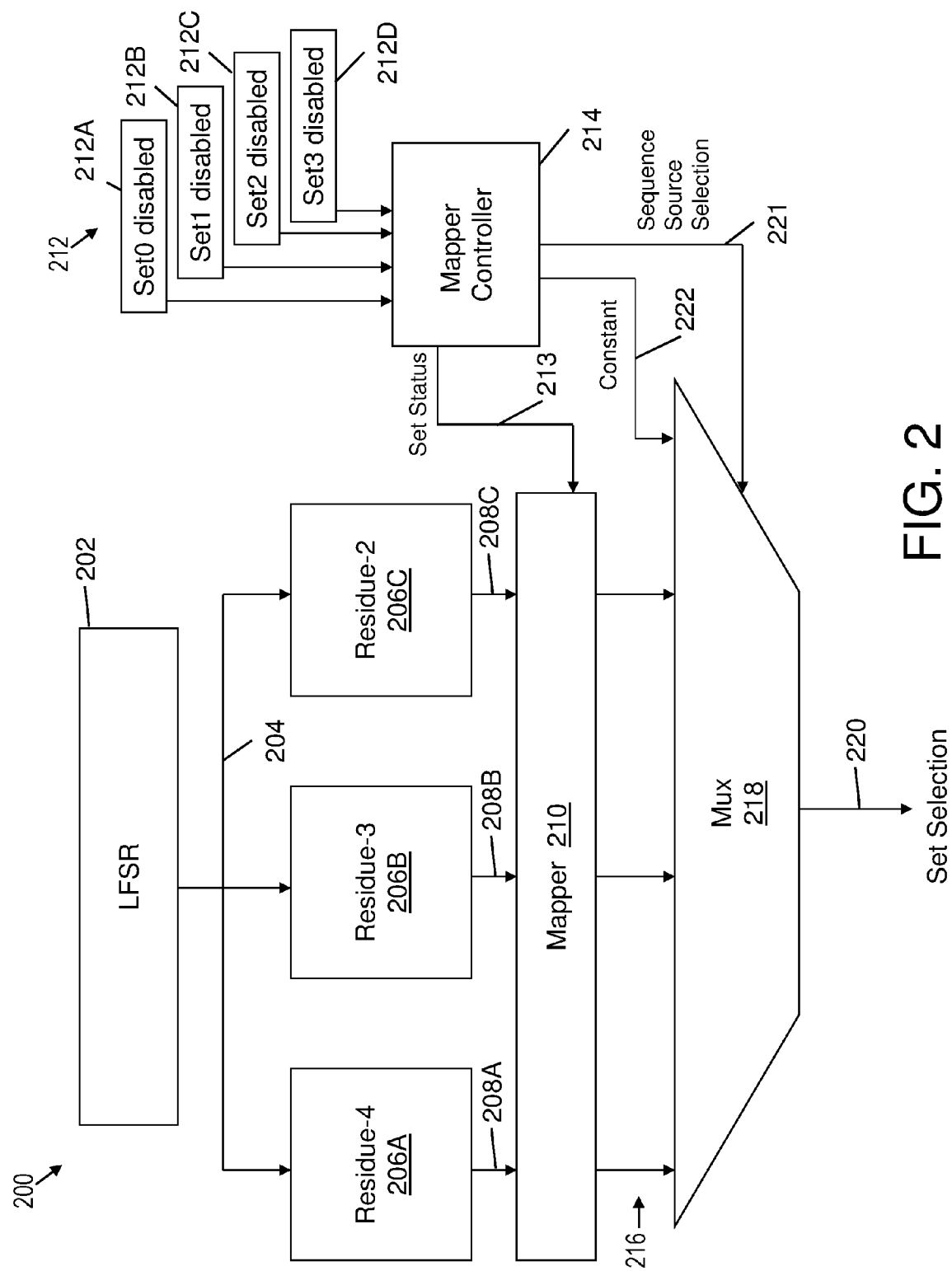
FIG. 2 is a block diagram of set selection logic of a set-associative storage container, according to some embodiments of this disclosure.

FIG. 2 is a block diagram of set selection logic 200 of a set-associative storage container 115 of FIG. 1, such as the cache 130 of FIG. 1. The set selection logic 200 includes a linear feedback shift register (LFSR) 202 that generates a vector 204 that is a random number (i.e., about 50% chance of each bit being a 0 or a 1). A maximal sequence of M bits allows the LFSR 202 to cycle through $2^M-1$ possible states before repeating, when a tap function is applied. Mapping a hash of a M-bit LFSR vector to each one of the available sets of a congruence class yields a random set selection that may provide the best performance per cost of the cache 130 of FIG. 1. The vector 204 may be hashed down to a reduced number of bits using XOR functions, e.g., XOR of all even bits for bit 0, and XOR of all odd bits for bit 1. For example, if the LFSR 202 creates a random 16-bit value, the vector 204 may be reduced down to a 2-bit value to support up to four states that uniquely identify up to four sets, such as sets 150A-150D of FIG. 1. The set selection logic 200 also includes two or more residue functions 206. In the example of FIG. 2, the residue function 206A outputs a residue of a modulo-4 operation, i.e., applying a modulus of four to the vector 204 such that the result is a state signal 208A, e.g., randomly changing between states of: 00, 01, 10, and 11. The residue function 206B outputs a residue of a modulo-3 operation, i.e. applying a modulus of three to the vector 204 such that the result is a state signal 208B, e.g., randomly changing between states of: 00, 01 and 10. The residue function 206C outputs a residue of a modulo-2 operation, i.e. applying a modulus of two to the vector 204 such that the result is a state signal 208C, e.g., randomly changing between states of 0 and 1. As can be seen in FIG. 2 each of the residue functions 206A-206C has a different modulus, such as four, three, or two. A larger number of associative sets can be supported with additional residue functions.

When considered in view of the congruence classes 140 of FIG. 1, each of the congruence classes 140 includes a number of sets 150, such as four sets 150A-150D in the example of FIG. 1. The number of the residue functions 206 is one less than the number of sets 150 per congruence class 140, e.g., three residue functions 206 vs. four sets 150A-150D. Further, the maximum modulus of the residue functions 206 is equal to the number of sets 150 per congruence class 140, which is four in this example. Therefore, the vector 204 generated by LFSR 202 can be hashed down to a number of bits to support the maximum modulus, e.g., 2-bits for a maximum modulus of four in residue function 206A. Further, a maximum of the number of disabled sets is one less than the number of sets 150 per congruence class 140 in order for the set-associative storage container 115 to have at least one set 150 enabled. Both an even and odd number of disabled sets are supported while maintaining random set selection, e.g., one, two, or three sets disabled.

A mapper 210 receives the state signals 208A-208C. The cache monitor 180 of FIG. 1 can identify one or more of the sets 150A-150D of FIG. 1 as being disabled. Set disabled indicators 212, including a set0 disabled indicator 212A, a set1 disabled indicator 212B, a set2 disabled indicator 212C, and a set3 disabled indicator 212D, can be used to determine a number of disabled sets and identification of which sets are enabled by a mapper controller 214. The mapper controller 214 can determine whether each set of the cache 130 of FIG. 1 as an instance of the set-associative storage container 115 in the system 100 of FIG. 1 is enabled or disabled based on the set disabled indicators 212. Identification of sets that are enabled or disabled can be provided to the mapper 210 in a set status 213. The mapper 210 can select one of the state signals 208A-208C that as a selected state signal 216 that has a same number of states as the number of the sets that are enabled. The mapper 210 maps the selected state signal 216 to the sets that are enabled to assign each of the states of the selected state signal 216 to a corresponding one of the sets that are enabled. Thus, if three sets are enabled and one set is disabled, the mapper 210 selects state signal 208B for the selected state signal 216 and maps each of the three random possible states to each of the three enabled sets, thereby avoiding the disabled set while maintaining a substantially equal probability of selection of each enabled set. A multiplexer 218 can be used to output a set selection 220 of the set-associative storage container 115 of FIG. 1 based on the mapping of the mapper 210 and the number of enabled sets to randomly select one of the enabled sets of the set-associative storage container 115 of FIG. 1. When the multiplexer 218 is included, the number of enabled sets is used as a sequence source selection 221 to select an input to the multiplexer 218 as the set selection 220.

As a further example, under normal operation, the residue function 206A is selected when all four sets 150A-150D of FIG. 1 are enabled, i.e., set disabled indicators 212 all indicate enabled. If one of the four sets 150A-150D is disabled (one of the set disabled indicators 212 is set), the LFSR 202 still generates the same vector 204, but the residue function 206B for residue-3 (i.e., three states) is selected that outputs a state signal 208B as a two-bit state with values of 00, 01, or 10. The enabled sets identified in the set status 213 are used by the mapper 210 to map each one of the three residue-3 states to one of the three remaining sets. For instance, if set2 150C is disabled, the value '00' gets mapped to set0 150A, the value '01' gets mapped to set1 150B, and the value '10' gets mapped to set3 150D. If set0 150A is disabled, the value '00' gets mapped to set1 150B, '01' is mapped to set2 150C, and '10' is mapped to set3 150D. The number of enabled sets is used for the sequence source selection 221 to control the multiplexer 218, which selects the selected state signal 216 that flows from the residue function 206B. Thus, for a 4-way set associative cache with one set disabled, one of the three remaining sets will be selected with a close to equal probability as the other sets using the same LFSR 202. Similarly, if two of the four sets are disabled, the vector 204 is fed into the residue function 206C to generate a residue-2 value, which outputs a two-state signal as state signal 208C. Again, the mapper 210 uses the set status 213 based on the set disabled indicators 212 to determine which two states are disabled, and the mapper 210 assigns an appropriate set to the value of the state signal 208C. For instance, if set0 150A and set1 150B are disabled, a residue-2 value of '0' maps to set2 150C and a value of '1' maps to set3 150D. If all but one of the sets 150A-150D are disabled, a constant value 222 that identifies the one enabled set is sent to the multiplexer 218 for set selection 220. For instance, if set0 150A, set1 150B, and set2 150C are disabled, then the only choice is set3 150D, which will always be selected.

Figure 3:
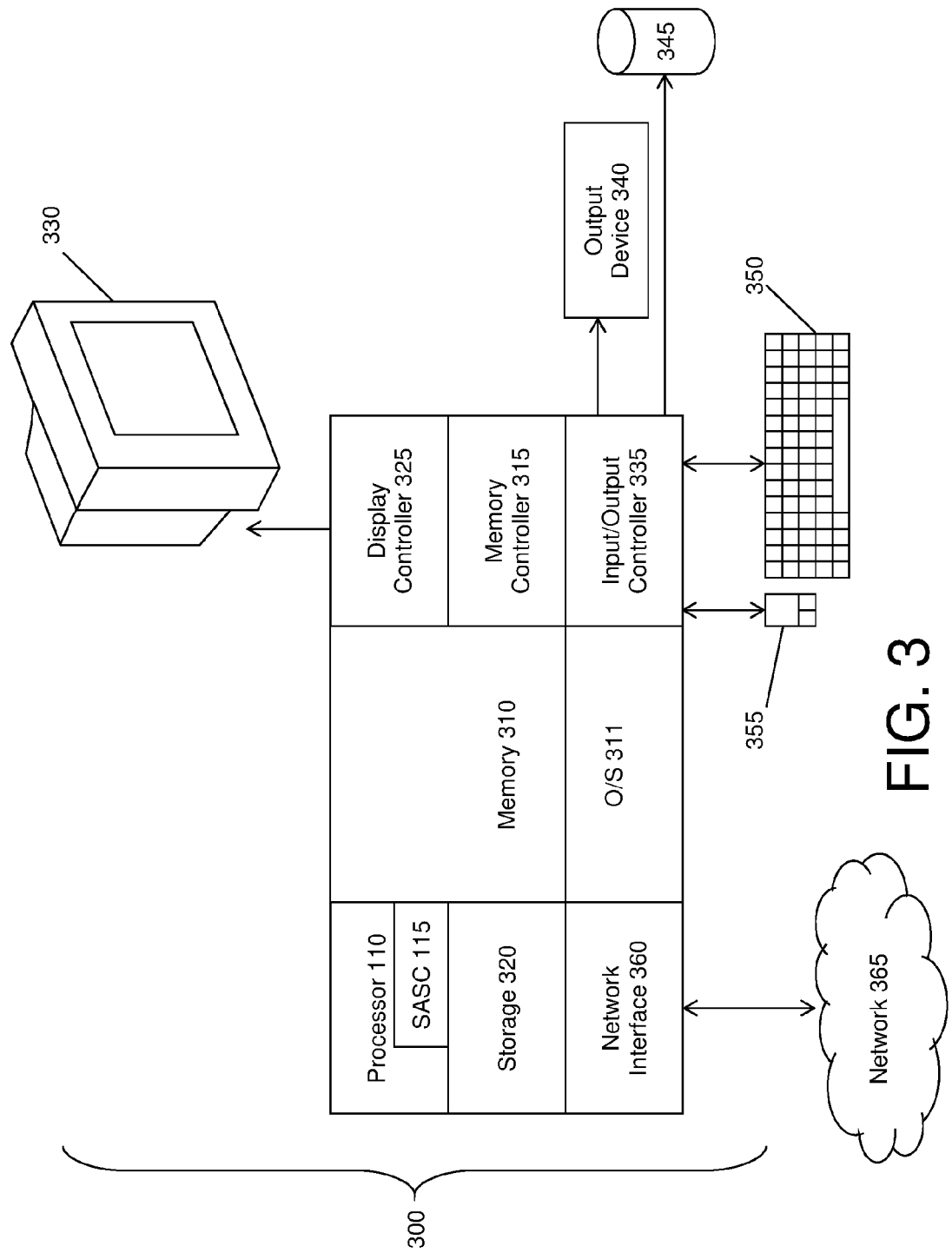
FIG. 3 is a block diagram of a computing device for implementing some or all aspects of the system of FIG. 1, according to some embodiments of this disclosure.

FIG. 3 illustrates a block diagram of a computer system 300 for use in implementing set selection of a set-associative storage container according to some embodiments. The systems and methods described herein may be implemented in hardware, software (e.g., firmware), or a combination thereof. In some embodiments, the methods described may be implemented, at least in part, in hardware and may be part of the microprocessor of a computer system 300, such as a personal computer, workstation, minicomputer, or mainframe computer.

In some embodiments, as shown in FIG. 3, the computer system 300 includes a processor 110, physical memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 110 is a hardware device for executing hardware instructions or software, particularly those stored in the physical memory 310. The processor 110 may be a custom made or commercially available processor, a central processing unit (CPU), an auxiliary processor among several processors associated with the computer system 300, a semiconductor based microprocessor (in the form of a microchip or chip set), a macroprocessor, or other device for executing instructions. The processor 110 includes at least one set-associative storage container 115 with set selection logic 200 as described above. The set-associative storage container 115, may include, but is not limited to, an instruction cache to speed up executable instruction fetch, a data cache to speed up data fetch and store, and a translation lookaside buffer (TLB) used to speed up virtual-to-physical address translation for both executable instructions and data.

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 110.

The instructions in memory 310 may include one or more separate programs, each of which comprises an ordered listing of executable instructions for implementing logical functions. In the example of FIG. 3, the instructions in the memory 310 include a suitable operating system (OS) 311.

The operating system 311 essentially may control the execution of other computer programs and provides scheduling, input-output control, file and data management, memory management, and communication control and related services.

Additional data, including, for example, instructions for the processor 110 or other retrievable information, may be stored in storage 320, which may be a storage device such as a hard disk drive or solid state drive.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computer systems 300, such as that illustrated in FIG. 3.

Figure 4:
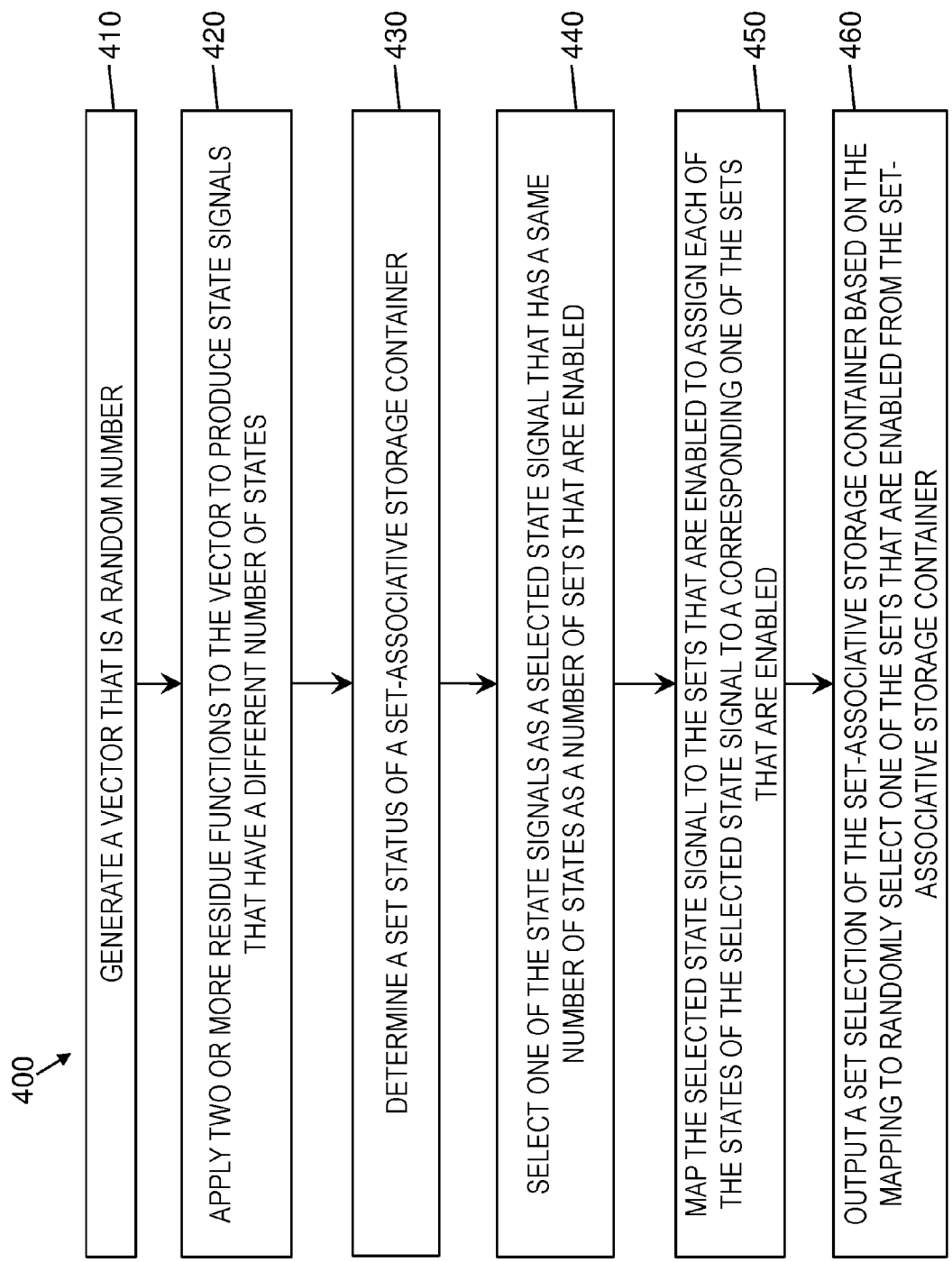
FIG. 4 is a flow diagram of a method for set selection of a set-associative storage container, according to some embodiments of this disclosure.

FIG. 4 is a flow diagram of a method 400 for set selection of a set-associative storage container, such as the set-associative storage container 115 of FIG. 1. The method 400 is described in reference to FIGS. 1-4. Although a particular order of blocks is depicted in FIG. 4, it will be understood that the blocks may be re-ordered, and additional blocks may be included beyond the example depicted in FIG. 4.

At block 410 of the method 400, a vector 204 is generated, where the vector 204 is a random number. The vector 204 can be generated by the LFSR 202 of FIG. 2. At block 420, two or more of the residue functions 206A-206C are applied to the vector 204, where the two or more residue functions 206A-206C each produces a state signal 208A-208C having a different number of states based on the vector 204. At block 430, a set status 213 of a set-associative storage container 115 in the system 100 is determined, where the set status 213 identifies whether each set of the set-associative storage container 115 is enabled or disabled based on the set disabled indicators 212. At block 440, one of the state signals 208A-208C is selected as a selected state signal 216 that has a same number of states as the number of sets that are enabled. At block 450, the selected state signal 216 is mapped to enabled sets to assign each of the states of the selected state signal 216 to a corresponding one of the sets that are enabled. At block 460, a set selection 220 of the set-associative storage container 115 is output based on the mapping to randomly select one of the sets that are enabled from the set-associative storage container 115. The set selection 220 identifies a next set to be replaced in a congruence class 140 of the set-associative storage container 115.

Technical effects and benefits of some embodiments include set selection of a set-associative storage container that randomly selects a next set for replacement with a substantially equal probability of selecting any of the enabled sets regardless of the number of sets that are disabled.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a set-associative storage container; and
a processor configured to perform:
generating a vector comprising a random number;
applying two or more residue functions to the vector, the two or more residue functions each producing a state signal comprising a different number of states based on the vector, wherein the two or more residue functions are residues of modulo operations each having a different modulus;
determining a set status of the set-associative storage container, the set status identifying whether each set of a plurality of sets of the set-associative storage container is enabled or disabled, wherein the set-associative storage container comprises a plurality of congruence classes, each of the congruence classes comprises a number of sets, and a number of the residue functions is one less than the number of sets per congruence class, wherein a maximum modulus of the residue functions is equal to the number of sets per congruence class, the vector is generated by a linear feedback shift register hashed down to a number of bits to support the maximum modulus, wherein a maximum number of disabled sets is one less than the number of sets per congruence class, and both an even and odd number of disabled sets are supported while maintaining random set selection;

selecting one of the state signals as a selected state signal that has a same number of states as a number of the sets that are enabled;

mapping the selected state signal to the sets that are enabled to assign each of the states of the selected state signal to a corresponding one of the sets that are enabled; and outputting a set selection of the set-associative storage container based on the mapping to randomly select one of the sets that are enabled from the set-associative storage container.

\* \* \* \* \*